US012807104B2

(12) United States Patent
Gunji et al.

(10) Patent No.: US 12,807,104 B2
(45) Date of Patent: Nov. 24, 2026

(54) COLLISION AVOIDANCE ASSISTANCE DEVICE

(71) Applicants: Hitachi Astemo, Ltd., Hitachinaka (JP); HONDA MOTOR CO., LTD., Tokyo (JP)

(72) Inventors: Kenta Gunji, Hitachinaka (JP); Satoshi Matsuda, Hitachinaka (JP); Yoshitaka Fukasawa, Hitachinaka (JP); Shinya Maruo, Wako (JP)

(73) Assignees: Hitachi Astemo, Ltd., Hitachinaka-shi (JP); HONDA MOTOR CO., LTD., Tokyo (JP)

( * ) Notice: Subject to any disclaimer, the term of this patent is extended or adjusted under 35 U.S.C. 154(b) by 225 days.

(21) Appl. No.: 18/340,117

(22) Filed: Jun. 23, 2023

(65) Prior Publication Data

US 2024/0034286 A1 Feb. 1, 2024

(30) Foreign Application Priority Data

Jul. 26, 2022 (JP) ................................ 2022-118931

(51) Int. Cl.
*B60T 7/22* (2006.01)
*B60T 8/172* (2006.01)
*B60T 8/58* (2006.01)

(52) U.S. Cl.
CPC ................ *B60T 7/22* (2013.01); *B60T 8/172* (2013.01); *B60T 8/58* (2013.01); *B60T 2201/022* (2013.01); *B60T 2210/32* (2013.01); *B60T 2250/04* (2013.01)

(58) Field of Classification Search
CPC ... B60T 7/22; B60T 8/172; B60T 8/58; B60T 2201/022; B60T 2210/32; B60T 2250/04
See application file for complete search history.

(56) References Cited

U.S. PATENT DOCUMENTS

2016/0244036 A1* 8/2016 Ike ............................ B60T 7/22
2020/0339080 A1* 10/2020 Ohmura ............ B60W 30/0953

FOREIGN PATENT DOCUMENTS

JP 2020-179729 A 11/2020

* cited by examiner

*Primary Examiner* — Andrew J Cromer
(74) *Attorney, Agent, or Firm* — Foley & Lardner LLP

(57) ABSTRACT

Provided is a collision avoidance assistance device with improved functionality and usability, which can suppress an excessive application or emergency application of the brakes in assisting avoidance of a collision with an object traveling in a lane orthogonal to a host vehicle (a road crossing the host vehicle). The collision avoidance assistance device calculates an amount of time to reach a predicted collision point that is an estimated amount of time until the host vehicle reaches the predicted collision point when the host vehicle is decelerated by a predetermined deceleration or braking force, and changes (increases or decreases) a brake application determination threshold based on a predicted passing time and the amount of time to reach the predicted collision point, the predicted passing time being an estimated time required for the object to pass through an intersecting region (predicted intersecting region) between a predicted path of the object (predicted target path) and a predicted path of the host vehicle (predicted host vehicle path).

6 Claims, 8 Drawing Sheets

COLLISION AVOIDANCE ASSISTANCE DEVICE

CROSS REFERENCE TO RELATED APPLICATIONS

The present application claims priority from Japanese patent application JP 2022-118931 filed on Jul. 26, 2022, the entire content of which is hereby incorporated by reference into this application.

BACKGROUND

Technical Field

The present invention relates to a collision avoidance assistance device for assisting a driving operation of a vehicle to avoid a collision with the surrounding target objects or to mitigate any damage from a collision.

Background Art

The technique disclosed in JP 2020-179729 A is an example of a device for assisting collision avoidance in an intersection. The collision avoidance assistance device disclosed in JP 2020-179729 A achieves avoidance of a possible collision with an object (target object) predicted to collide with a host vehicle by applying a brake in a position such that the host vehicle can stop without entering the intersection based on a time to collision that is the time that remains until the host vehicle collides the object.

SUMMARY

When applying the brake in the position such that the host vehicle can stop without entering the intersection based on the time to collision as in the above-stated collision avoidance assistance device, the distance required for the host vehicle to stop increases as the host vehicle speed increases. Thus, the brake is applied in a position distant from the object predicted to collide with the host vehicle.

However, as the distance from the host vehicle to the object increases, the object recognition accuracy of a sensor and the accuracy of predicting a path of the host vehicle and a path of the object decrease, and the accuracy of predicting whether or not the host vehicle and the object will collide decreases. This may cause an excessive application of the emergency brakes, leading to inconvenience and load for a driver, and thus there is an issue of functionality and usability.

In view of the foregoing, the present invention provides a collision avoidance assistance device with improved functionality and usability, which can suppress an excessive application or emergency application of the brakes in assisting avoidance of a collision with an object traveling in a lane orthogonal to a host vehicle (i.e., a road crossing the host vehicle).

To solve the above issue, the present invention is configured as follows. That is, a collision avoidance assistance device is configured to: calculate a predicted path of a host vehicle and a predicted path of an object present on a road crossing the host vehicle; calculate a time to collision and a predicted collision point between the host vehicle and the object based on the predicted path of the host vehicle and the predicted path of the object; and if the time to collision or a travel distance of the host vehicle in the time to collision is equal to or smaller than a brake application determination threshold, decelerate the host vehicle by a predetermined deceleration or braking force to avoid a collision with the object. The collision avoidance assistance device is configured to: calculate an amount of time to reach the predicted collision point, the amount of time to reach the predicted collision point being an estimated amount of time until the host vehicle reaches the predicted collision point when the host vehicle decelerates by the predetermined deceleration or braking force; and change the brake application determination threshold based on a predicted passing time and the amount of time to reach the predicted collision point, the predicted passing time being an estimated time required for the object to pass through an intersecting region between the predicted path of the object and the predicted path of the host vehicle.

According to the present invention, it is possible to improve functionality and usability by suppressing an excessive application or emergency application of the brakes in assisting avoidance of a collision with an object traveling in a lane orthogonal to a host vehicle (i.e., a road crossing the host vehicle).

Other issues, configurations, and advantageous effects will become apparent from the following description of an embodiment.

DETAILED DESCRIPTION

Figure 1:
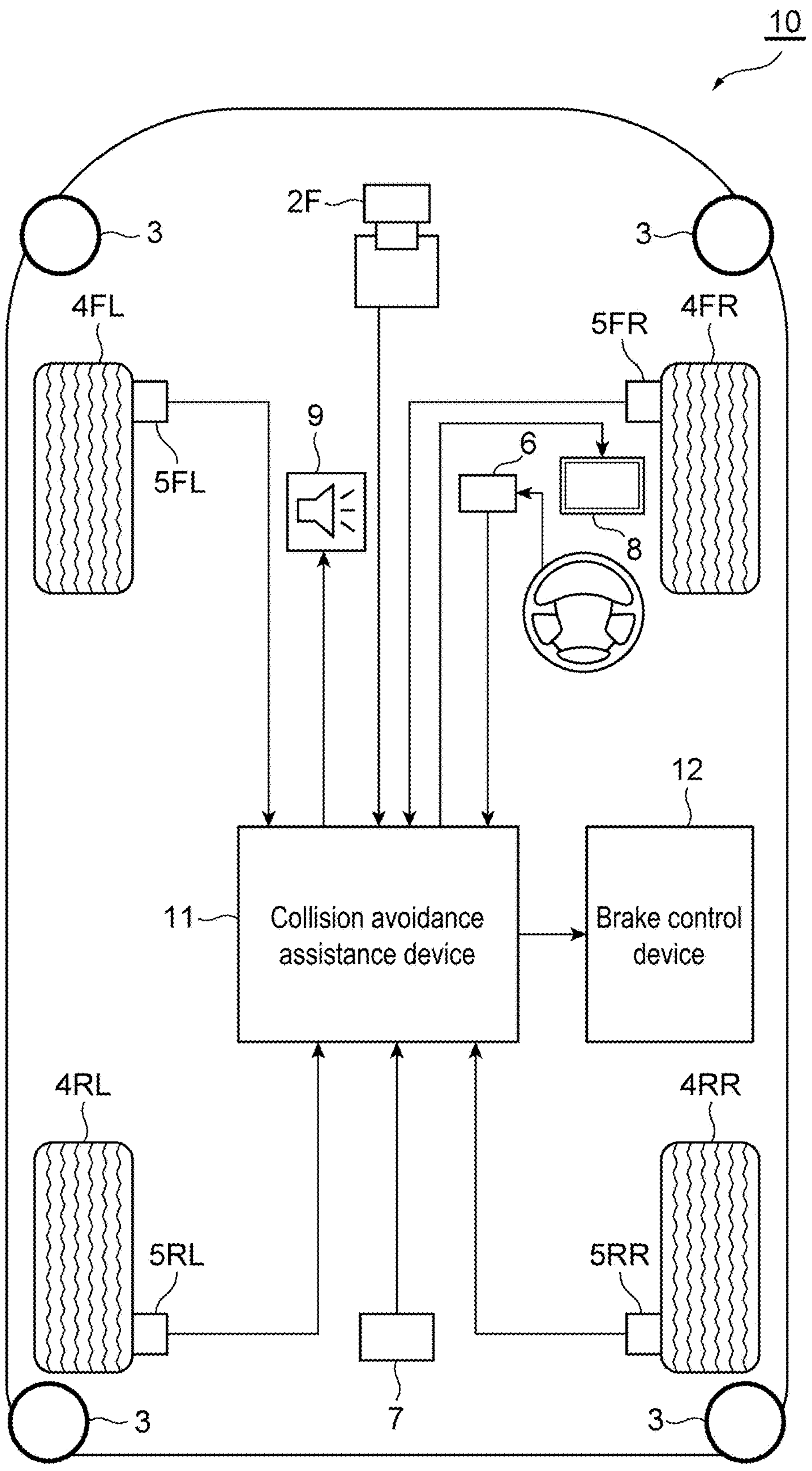
FIG. 1 is an example of the schematic configuration diagram of a vehicle having installed thereon one embodiment of a collision avoidance assistance device to which the present invention is applied.

Hereinafter, an embodiment of the present invention will be described with reference to the drawings. Parts having the same function are denoted by the same reference numerals throughout the drawings for illustrating the embodiment, and repeated description thereof may be omitted.

FIG. 1 schematically shows a vehicle having installed thereon one embodiment of a collision avoidance assistance device according to the present invention. A collision avoidance assistance device 11 is installed on a vehicle (host vehicle) 10, and assists a driving operation of the vehicle 10 (in this example, assists avoidance of a collision with an object traveling in a lane orthogonal to the host vehicle (i.e., a road crossing the host vehicle)).

The vehicle 10 of the illustrated embodiment includes a front camera 2F (hereinafter this may be simply referred to as a camera 2) mounted on the front side of the vehicle, radars 3, a right front wheel speed sensor 5FR for detecting a wheel speed of a right front wheel 4FR, a right rear wheel speed sensor 5RR for detecting a wheel speed of a right rear wheel 4RR, a left rear wheel speed sensor 5RL for detecting a wheel speed of a left rear wheel 4RL, a left front wheel speed sensor 5FL for detecting a wheel speed of a left front wheel 4FL, a steering angle sensor 6, a yaw rate sensor 7, a meter 8, a buzzer 9, a collision avoidance assistance device 11, a brake control device 12, and the like.

The front camera 2F includes a lens and an imaging element, and is appropriately disposed so as to be able to capture images of the environment around the host vehicle 10. The images captured by the front camera 2F are transmitted to the collision avoidance assistance device 11 and subjected to image processing. The collision avoidance assistance device 11 identifies a target type of a target object (hereinafter appropriately referred to as a target) around the host vehicle 10 based on the captured images transmitted from the front camera 2F. Examples of the target type include automobiles, bicycles, pedestrians, motorcycles, traveling roads, lanes indicated by white lines and yellow lines or the like, traffic lights, traffic signs, obstacles, and the like. In the present embodiment, one camera 2 is disposed to capture images of the environment around the host vehicle 10. However, a plurality of cameras 2 may be disposed. The camera 2 may be a monocular camera or a stereo camera, and the type of camera or the function of the camera may be changed as necessary.

The radars 3 are disposed at four corners of the vehicle 10. Each radar 3 emits electromagnetic waves, for example, and receives reflective waves generated by reflection of the electromagnetic waves on the surrounding targets, thereby measuring the positions and speeds of the targets around the host vehicle 10, and transmits the results of measurement to the collision avoidance assistance device 11. The radar 3 may be, for example, a millimeter wave radar or a laser radar. Instead of the radar, an ultrasonic sensor may be used. Further, the speeds and positions of the targets may be measured by using a plurality of sensors in combination.

In the present embodiment, the camera 2 and the radar 3 are used in combination in one example of a method of acquiring information on the targets around the host vehicle 10. However, a lidar may be combined instead of the radar 3 or a plurality of sensors may be used, for example.

On the front, rear, right, and left sides of the body of the host vehicle 10, the right front wheel 4FR, the right rear wheel 4RR, the left rear wheel 4RL, and the left front wheel 4FL are disposed, which are respectively provided with the right front wheel speed sensor 5FR, the right rear wheel speed sensor 5RR, the left rear wheel speed sensor 5RL, and the left front wheel speed sensor 5FL. The wheel speed sensors 5FR, 5RR, 5RL, 5FL each detect a wheel speed, and transmit the detected wheel speed to the collision avoidance assistance device 11. The collision avoidance assistance device 11 calculates a speed of the host vehicle 10 based on the information on the wheel speeds. Unless otherwise specified, the right front wheel 4FR, the right rear wheel 4RR, the left rear wheel 4RL, and the left front wheel 4FL will be referred to as the wheel 4, and the right front wheel speed sensor 5FR, the right rear wheel speed sensor 5RR, the left rear wheel speed sensor 5RL, and the left front wheel speed sensor 5FL will be referred to as the wheel speed sensor 5.

The steering angle sensor 6 is a sensor for detecting a rotational angle (steering angle) of the steering wheel of the host vehicle 10, and the steering angle detected by the steering angle sensor 6 is transmitted to the collision avoidance assistance device 11.

The yaw rate sensor 7 detects a yaw rate of the host vehicle 10, and the yaw rate detected by the yaw rate sensor 7 is transmitted to the collision avoidance assistance device 11.

The meter 8, when the collision avoidance assistance device 11 determines that there is a high possibility of a collision between the host vehicle 10 and the target, for example, displays an alert image for notifying the high possibility of a collision to a driver. In the present embodiment, the meter 8 is disposed as one example of the method of displaying an alert image. However, instead of the meter 8, for example, a part of a car navigation system may be used or a head-up display may be used to display an image.

The buzzer 9, when the collision avoidance assistance device 11 determines that there is a high possibility of a collision between the host vehicle 10 and the target, for example, sounds an alert for notifying the high possibility of a collision to a driver. In the present embodiment, the buzzer 9 is disposed as one example of the method of sounding an alert. However, instead of the buzzer 9, for example, a part of a car navigation system may be used or an alert sound may be emitted from a speaker.

The collision avoidance assistance device 11 is configured to be able to implement collision avoidance assistance operations of avoiding a collision between the host vehicle 10 and the target or mitigating any damage from a collision. The collision avoidance assistance device 11 is configured to be able to output a control signal for activating the meter 8, the buzzer 9, and the brake control device 12 based on the information received from the plurality of sensors stated above. In the present embodiment, the collision avoidance assistance device 11 is configured as an ECU (Electric Control Unit) installed on the host vehicle 10, for example, and in order to implement the collision avoidance assistance operations, assists any or all of causing the meter 8 to display an alert image, causing the buzzer 9 to sound an alert, or automatically applying a brake via the brake control device 12.

The brake control device 12 controls a braking device (not shown) of the host vehicle 10. The brake control device 12 is a component capable of adjusting a braking force generated by the braking device according to a control signal output from the collision avoidance assistance device 11, and includes brake actuators, such as a hydraulic pump and a valve unit, for example.

Figure 2:
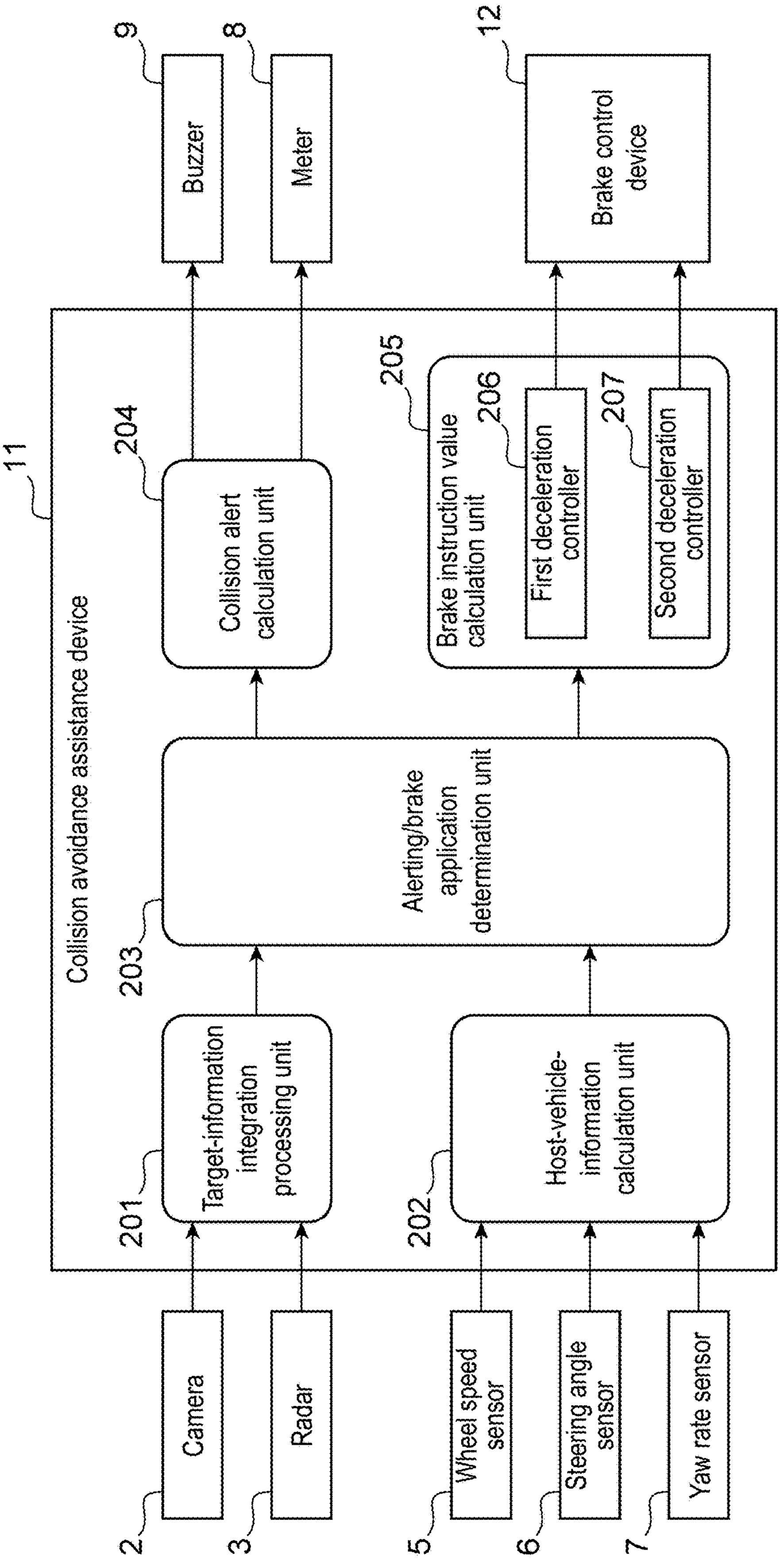
FIG. 2 is an example of the functional block diagram of the embodiment of the collision avoidance assistance device to which the present invention is applied.

FIG. 2 shows a configuration of functional blocks inside of the collision avoidance assistance device 11 shown in FIG. 1. Such functional blocks are implemented by hardware, software, or a combination thereof. Each function of the collision avoidance assistance device 11 is implemented by a processer, such as a CPU (Central Processing Unit), that executes a program stored in a ROM (Read Only Memory). A RAM (Random Access Memory) stores data including intermediate data on operation by a program executed by the processer.

As shown in FIG. 2, the collision avoidance assistance device 11 basically includes a target-information integration processing unit 201, a host-vehicle-information calculation unit 202, an alerting/brake application determination unit 203, a collision alert calculation unit 204, and a brake instruction value calculation unit 205.

The target-information integration processing unit 201 integrates information formats of the types of targets, such as vehicles, bicycles, and pedestrians, and the current target positions and target speeds acquired from each of the camera 2 and the radars 3, and a coordinate system. In one example, the coordinate system used in the present embodiment includes a point of origin at the center on the front end of the host vehicle 10, a longitudinal direction that is the total length direction of the host vehicle 10, and a lateral direction that is the total width direction of the host vehicle 10, to determine a current position of the target (hereinafter appropriately referred to as a current target position) and a speed of the target (hereinafter appropriately referred to as a target speed). When the same target is detected using the plurality of sensors, a current target position and a target speed may be determined in consideration of errors in the front-rear direction and right-left direction of the camera 2 and the radars 3. In addition, from the target speed, the target-information integration processing unit 201 calculates target information necessary for the alerting/brake application determination unit 203, such as an acceleration of the target.

The host-vehicle-information calculation unit 202 calculates a turning radius of the host vehicle 10 that is necessary for the alerting/brake application determination unit 203 to predict a path of the host vehicle based on the speed of the host vehicle (hereinafter appropriately referred to as a host vehicle speed) acquired from the wheel speed sensor 5, the steering angle of the host vehicle (hereinafter appropriately referred to as a host vehicle steering angle) acquired from the steering angle sensor 6, and the yaw rate of the host vehicle (hereinafter appropriately referred to as a host vehicle yaw rate) acquired from the yaw rate sensor 7.

The alerting/brake application determination unit 203 predicts a path of the host vehicle 10 and a path of the target based on the current target position, the target speed, and the acceleration of the target acquired from the target-information integration processing unit 201, and the host vehicle position, the host vehicle speed, the host vehicle acceleration, the host vehicle steering angle, the host vehicle yaw rate, and the host vehicle turning radius of the host vehicle 10 acquired from the plurality of sensors and the host-vehicle-information calculation unit 202. Based on the predicted path of the host vehicle 10 (hereinafter appropriately referred to as a predicted host vehicle path) and the predicted path of the target (hereinafter appropriately referred to as a predicted target path), the alerting/brake application determination unit 203 calculates a predicted time for a collision between the host vehicle 10 and the target (hereinafter appropriately referred to as a time to collision). Based on the time to collision, the alerting/brake application determination unit 203 calculates a predicted point of the collision between the host vehicle 10 and the target (hereinafter appropriately referred to as a predicted collision point), and determines whether there is a possibility of a collision between the host vehicle 10 and the target (hereinafter appropriately referred to as collision determination). Based on the host vehicle speed, the alerting/brake application determination unit 203 calculates a threshold used for determining whether or not to apply a brake (hereinafter appropriately referred to as a brake application determination threshold), and based on the result of comparison between the calculated threshold (brake application determination threshold) and the time to collision and the result of the collision determination, makes a request for an alerting and a brake application according to the predicted time for a collision with the target.

The collision alert calculation unit 204 outputs a request for displaying an alert image to the meter 8 or a request for sounding an alert to the buzzer 9, or both of the request for displaying an alert image and the request for sounding an alert based on the request for the alerting acquired from the alerting/brake application determination unit 203.

The brake instruction value calculation unit 205 outputs a brake instruction value required to avoid the collision with the target to the brake control device 12 based on the request for the brake application acquired from the alerting/brake application determination unit 203. The brake instruction value calculation unit 205 includes a first deceleration controller 206 or a second deceleration controller 207, or both of the first deceleration controller 206 and the second deceleration controller 207. The first deceleration controller 206 outputs a first deceleration or a first braking force to the brake control device 12, and the second deceleration controller 207 outputs a second deceleration or a second braking force to the brake control device 12. The first deceleration or the first braking force from the first deceleration controller 206 and the second deceleration or the second braking force from the second deceleration controller 207 are set in advance according to the vehicle, the surrounding environment, and the like. The second deceleration is smaller than the first deceleration, and the second braking force is smaller than the first braking force.

Figure 3:
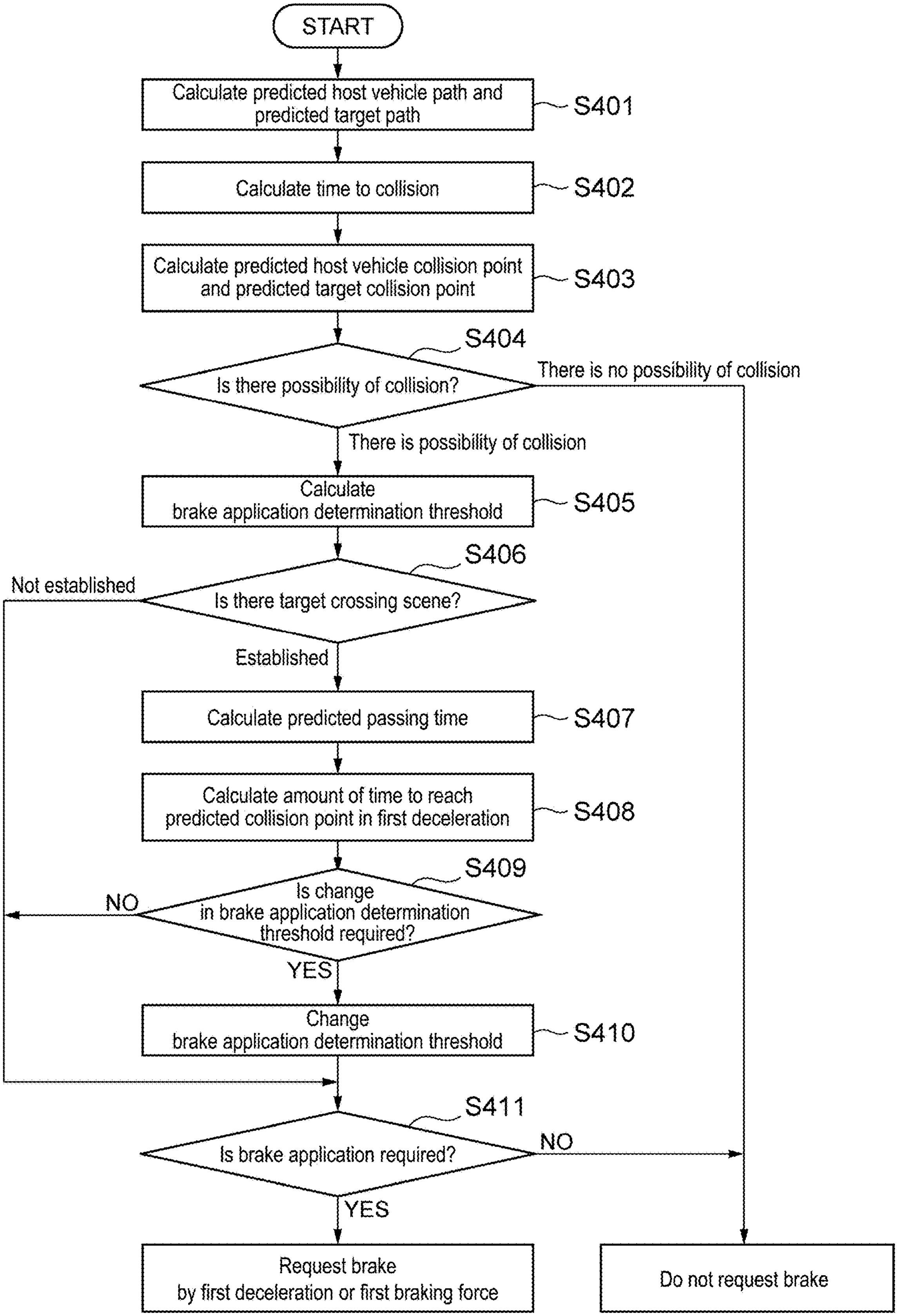
FIG. 3 is a flowchart of an alerting/brake application determination unit when a threshold used for determining whether or not to apply a brake is decreased.

FIG. 3 is an example of the flowchart of the alerting/brake application determination unit 203, in the collision avoidance assistance in the embodiment of the present invention, when the threshold (brake application determination threshold) calculated in the alerting/brake application determination unit 203 is decreased in avoidance of a collision by the first deceleration or the first braking force.

In FIG. 3, in step S401, based on the target position and the target speed acquired from the target-information integration processing unit 201 and the host vehicle speed and the host vehicle yaw rate acquired from the plurality of sensors and the host-vehicle-information calculation unit 202, the alerting/brake application determination unit 203 calculates a predicted host vehicle path and a predicted target path. The predicted host vehicle path and the predicted target path may be calculated in consideration of at least one of the acceleration of the target or the acceleration of the host vehicle.

In step S402, the alerting/brake application determination unit 203 calculates a time to collision based on the predicted host vehicle path and the predicted target path. The time to collision is an amount of time that elapses until the distance from the host vehicle 10 to the target in the longitudinal direction (hereinafter appropriately referred to as a target current longitudinal distance) reaches 0 while traveling at the current host vehicle speed and the target speed.

In step S403, the alerting/brake application determination unit 203 calculates a host vehicle position in the longitudinal direction and in the lateral direction at the predicted collision point after the time to collision based on the host vehicle speed and the host vehicle yaw rate, and calculates a target position in the longitudinal direction and in the lateral direction at the predicted collision point after the time to collision based on the target speed and the current target position.

In step S404, the alerting/brake application determination unit 203 performs collision determination based on the position of the host vehicle 10 at the predicted collision point. In one example of the determination method, the alerting/brake application determination unit 203 determines whether there is an overlapping portion between the host vehicle 10 and the target based on the position of the front end of the host vehicle 10 at the predicted collision point and the position of the side surface of the target at the predicted collision point, and if there is an overlapping portion, determines that there is a possibility of a collision at the predicted collision point, establishes the collision determination, and then proceeds to step S405. If the collision determination is not established, the alerting/brake application determination unit 203 determines that there is no possibility of a collision of the host vehicle 10 with the target, and will not perform step S405 to step S411 (will not make a request for a brake application).

In step S405, the alerting/brake application determination unit 203 calculates a distance required for the host vehicle 10 to stop (hereinafter appropriately referred to as a host vehicle stopping distance) when the host vehicle 10 traveling at the host vehicle speed decelerates by the first deceleration or the first braking force by the first deceleration controller 206. The amount of time that elapses during travel of the host vehicle 10 at the host vehicle speed for the host vehicle stopping distance is set as a threshold used for determining whether a brake application is required (brake application determination threshold) to avoid a collision. In the present embodiment, a time is employed to compare the brake application determination threshold with the predicted time for a collision. However, a distance may be employed instead of the time, and when the distance is employed, the host vehicle stopping distance is set as the brake application determination threshold.

In step S406, the alerting/brake application determination unit 203 determines whether the target is traveling on the road crossing the host vehicle path based on the predicted host vehicle path and the predicted target path. If the target is traveling on the road crossing the host vehicle path, the alerting/brake application determination unit 203 establishes the determination and proceeds to step S407, and if the determination is not established, proceeds to step S411.

In step S407, the alerting/brake application determination unit 203 calculates an amount of time (hereinafter appropriately referred to as a predicted passing time) that elapses between when the target reaches a target predicted lateral position and, after reaching, the target finishes passing through a region (hereinafter appropriately referred to as a predicted intersecting region) in which the predicted host vehicle path and the predicted target path cross. The length of the predicted intersecting region is calculated based on the width of the host vehicle and the total length of the target. However, in addition to the width of the host vehicle and the total length of the target, the alerting/brake application determination unit 203 may consider a margin distance in consideration of the host vehicle speed and the target speed, the positional relationship between the host vehicle 10 and the target, an error in the detection accuracy of the sensor, and the like. Since the ratio of overlap (hereinafter appropriately referred to as a predicted overlap ratio) between the host vehicle 10 and the target at the predicted collision point changes depending on the host vehicle speed and the target speed and the positional relationship between the host vehicle 10 and the target, the alerting/brake application determination unit 203 may first calculate a predicted overlap ratio and then calculate a predicted passing time based on the calculated predicted overlap ratio.

Figure 4:
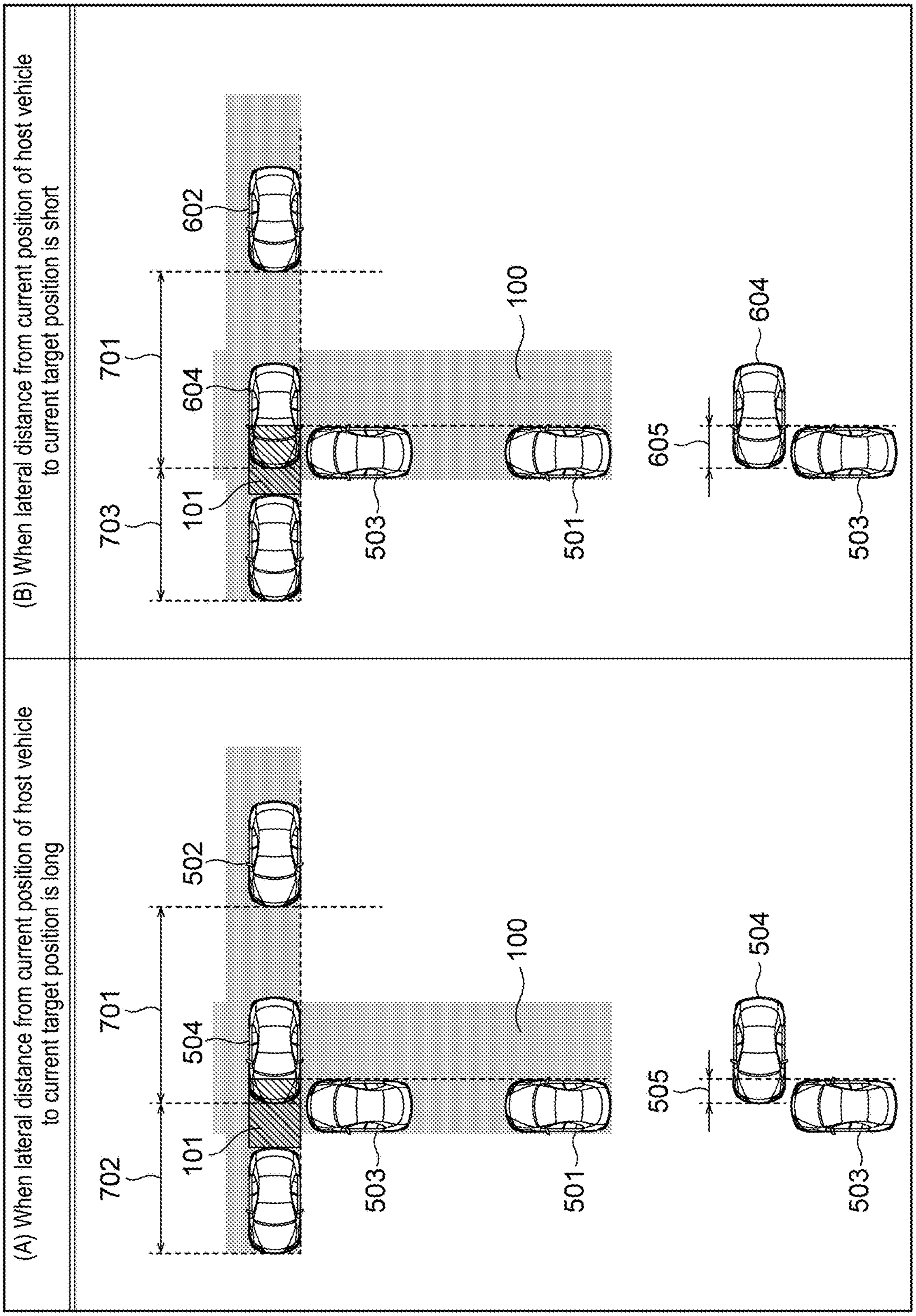
FIG. 4 shows an example of calculating a predicted passing time based on a predicted overlap ratio.

Now referring to FIG. 4, when the host vehicle speed is equal to the target speed on a road 100 with an intersection, a predicted overlap ratio between the host vehicle 10 and the target at a predicted collision point will be described for each of the case where the lateral distance from the current position of the host vehicle 10 to the current target position is long (column (A) of FIG. 4) and the case where the lateral distance from the current position of the host vehicle 10 to the current target position is short (column (B) of FIG. 4). 501 denotes the current position of the host vehicle. 502 and 602 each denote the current target position. Provided that the distance from the lateral position of the current target position 502 to the host vehicle 10 is longer than that the distance from the lateral position of the current target position 602 to the host vehicle 10. 503 denotes the position of the host vehicle 10 at the predicted collision point calculated in step S403. 504 denotes the position of the target at the predicted collision point in the case of the current target position 502. 604 denotes the position of the target at the predicted collision point in the case of the current target position 602. 101 denotes the predicted intersecting region calculated in step S407. 701 denotes the distance from the current target position to the predicted collision point, and given the same target speed and time to collision, the distance from the current target position to the predicted collision point is the same even if the current target position is different. 702 denotes the distance required for the target to pass through the predicted intersecting region 101 from the position 504 of the target at the predicted collision point. 703 denotes the distance required for the target to pass through the predicted intersecting region 101 from the position 604 of the target at the predicted collision point. 505 denotes the predicted overlap ratio that is the length (ratio) of the overlapping portion between the host vehicle 10 and the target at the predicted collision point. Also 605 denotes the predicted overlap ratio at the predicted collision point. The distance from the lateral position of the current target position 502 to the host vehicle 10 is longer than the lateral position of the current target position 602 to the host vehicle 10. Given the same target speed, the length denoted by 605 is longer than the length denoted by 505, and thus the predicted overlap ratio in the case of the current target position 502 is smaller than the predicted overlap ratio in the case of the current target position 602. Similarly, given the same target speed, the distance denoted by 703 is shorter than the distance denoted by 702, and thus the predicted passing time of the target in the case of the current target position 602 is shorter than the predicted passing time of the target in the case of the current target position 502.

In this manner, since the predicted passing time differs depending on the predicted overlap ratio even if the target speed is the same, calculating a predicted passing time based on the calculated predicted overlap ratio allows calculating a predicted passing time according to the positional relationship between the host vehicle 10 and the target. Since the alerting/brake application determination unit 203 changes the threshold for determining whether or not to apply a brake (brake application determination threshold) based on this predicted passing time in step S410, it is possible to apply a brake in a region where the distance from the host vehicle 10 to the target is short, thus suppressing an excessive application of the brakes.

In step S407, when the target speed is high or when the distance from the host vehicle 10 to the target is long, an error is included in the detection information, such as the speed and position of the target detected by the sensor. Thus, when the predicted passing time calculated based on the information detected by the sensor is shorter than the predicted passing time calculated based on the actual position of the target, an amount of time until the target finishes passing through the predicted intersecting region may not be ensured, and the host vehicle 10 may collide with the target. Accordingly, when the target speed is higher than a predetermined speed, or when the target current longitudinal distance is longer than a predetermined distance, or both of when the target speed is higher than the predetermined speed and when the target current longitudinal distance is longer than the predetermined distance, a predetermined time is added to the predicted passing time, so that the collision of the host vehicle 10 with the target is avoided.

The predetermined speed, the predetermined distance, and the predetermined time (time to be added to the predicted passing time) may be variable depending on the speeds of the host vehicle 10 and the target and the positional relationship therebetween. In other words, the predetermined speed, the predetermined distance, and the predetermined time (time to be added to the predicted passing time) may be calculated based on the speeds of the host vehicle 10 and the target and the positional relationship therebetween. To avoid a collision of the host vehicle 10 with the target due to the target decelerating after the host vehicle 10 applies a brake, the predicted passing time may be calculated in consideration of a current acceleration of the target, or an allowance may be added to the predicted passing time in advance in consideration of the target decelerating at a constant deceleration.

In step S408, the alerting/brake application determination unit 203 calculates an amount of time that elapses until the host vehicle 10 reaches the predicted collision point (hereinafter appropriately referred to as an amount of time to reach the predicted collision point or an amount of time to reach the predicted collision point in first deceleration) when the host vehicle 10, at the host vehicle speed and the current host vehicle position, decelerates by the first deceleration or the first braking force by the first deceleration controller 206. If the distance from the host vehicle 10 to the predicted collision point is longer than the host vehicle stopping distance, the host vehicle 10 will stop before reaching the predicted collision point when the host vehicle 10 decelerates by the first deceleration or the first braking force by the first deceleration controller 206. In this case, in one example, the amount of time to reach the predicted collision point is set to a value larger than the predicted passing time.

In step S409, the alerting/brake application determination unit 203 determines whether or not a change in the brake application determination threshold calculated in step S405 is required (hereinafter appropriately referred to as threshold change determination) based on the predicted passing time and the amount of time to reach the predicted collision point in first deceleration. If the amount of time to reach the predicted collision point is longer than the predicted passing time (in other words, if the predicted passing time is shorter than the amount of time to reach the predicted collision point), since the target has already passed through the predicted intersecting region 101 at a point in time when the host vehicle 10 reaches the predicted collision point after decelerating by the first deceleration or the first braking force by the first deceleration controller 206, the alerting/brake application determination unit 203 determines that the host vehicle 10 will not collide with the target even when the brake application determination threshold is decreased, and then proceeds to step S410. If the amount of time to reach the predicted collision point is shorter than the predicted passing time (in other words, if the predicted passing time is longer than the amount of time to reach the predicted collision point), since the target has not passed through the predicted intersecting region 101 yet at a point in time when the host vehicle 10 reaches the predicted collision point by decelerating by the first deceleration or the first braking force by the first deceleration controller 206, the alerting/brake application determination unit 203 determines not to decrease the brake application determination threshold, and then proceeds to step S411.

The determination based on the host vehicle speed and the target speed may be added to the threshold change determination. Setting the brake application determination threshold to a smaller value when the host vehicle speed is low or setting the brake application determination threshold to an even smaller value may cause the host vehicle 10 to apply a brake in a position even closer to the target, thus increasing the possibility of a collision with the target. Therefore, when the host vehicle speed is lower than a predetermined value (a predetermined host vehicle speed threshold), the alerting/brake application determination unit 203 does not change the brake application determination threshold. When the target speed is low, it is considered that the target may stop within the predicted intersecting region. Accordingly, when the target speed is lower than a predetermined speed (a predetermined object speed threshold), the alerting/brake application determination unit 203 does not change the brake application determination threshold. In other words, when the host vehicle speed is equal to or lower than the predetermined value or when the target speed is equal to or lower than the predetermined speed, the alerting/brake application determination unit 203 prohibits changing the brake application determination threshold, and when the host vehicle speed is larger than the predetermined value, and when the target speed is higher than the predetermined speed, the alerting/brake application determination unit 203 allows changing the brake application determination threshold.

In step S410, the alerting/brake application determination unit 203 decreases the brake application determination threshold calculated in step S405 by a predetermined time. The predetermined time is variable depending on the speeds of the host vehicle 10 and the target and the positional relationship therebetween.

Figure 5:
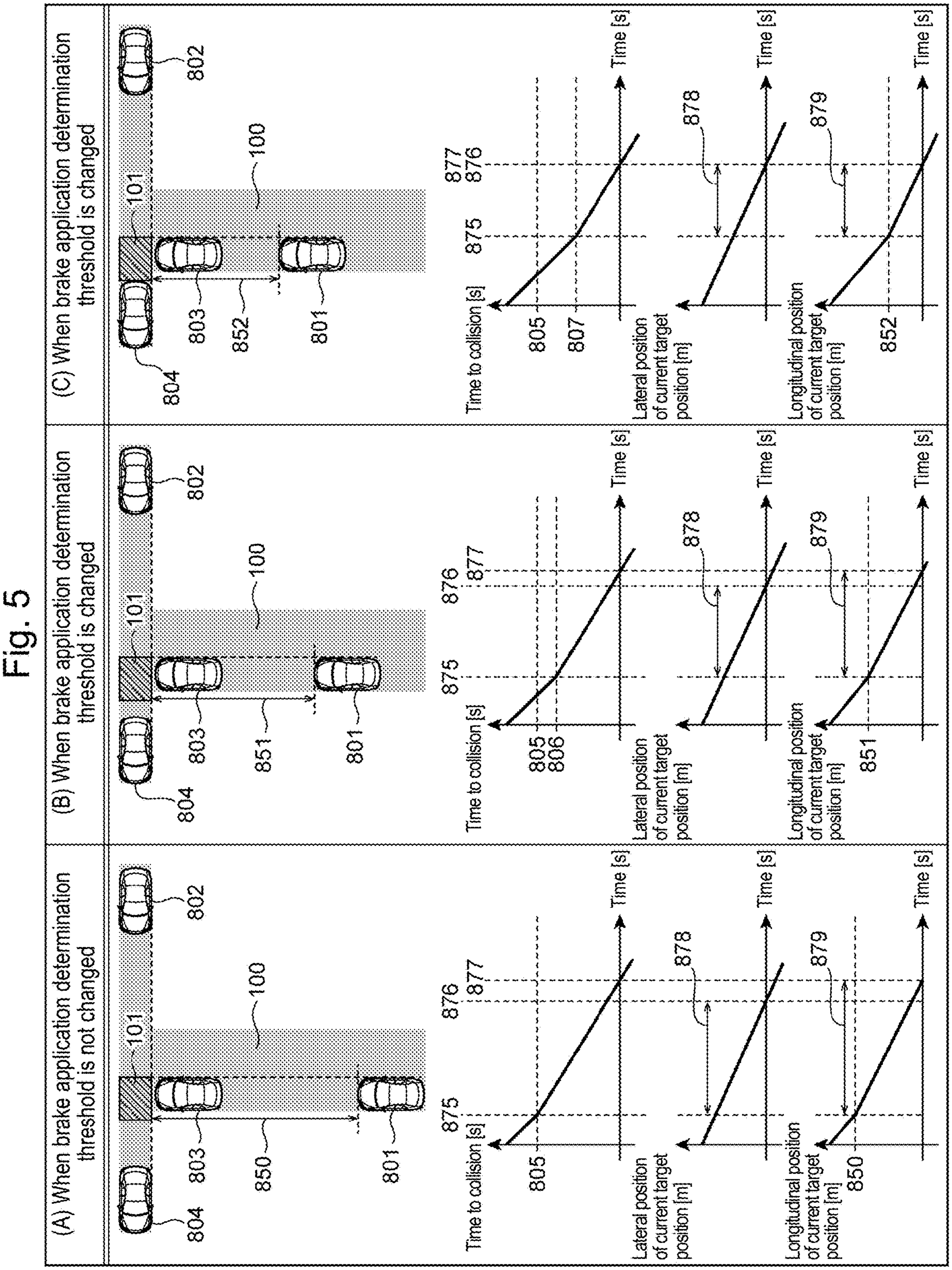
FIG. 5 shows an example of changes over time in a time to collision, a lateral position of a target, and a longitudinal position of a target when the threshold used for determining whether or not to apply a brake is decreased.

FIG. 5 shows the positional relationship between the host vehicle 10 and the target during the brake application, and changes over time in the time to collision, the lateral position of the current target position, and the longitudinal position of the current target position for each of the case where the brake application determination threshold is not changed in step S410 on the road 100 with an intersection in one example (column (A) of FIG. 5) and the case where the brake application determination threshold is changed (column (B) and column (C) of FIG. 5). A current host vehicle position 801 indicates the current position of the host vehicle 10, and a current target position 802 indicates the current position of the target. A predicted position 803 in deceleration of the host vehicle indicates the position of the host vehicle 10 after the amount of time to reach the predicted collision point has elapsed when the host vehicle 10 decelerates in the current host vehicle position 801 by the first deceleration or the first braking force by the first deceleration controller 206. A predicted position 804 in deceleration of the target indicates the position of the target after the amount of time to reach the predicted collision point has elapsed when there is no change in the target speed from the current target position 802.

A brake application determination threshold 805 indicates the brake application determination threshold calculated in step S405, and a brake application determination threshold 806 and a brake application determination threshold 807 each indicate the brake application determination threshold decreased by the predetermined time in step S410. The brake application determination threshold 806 is larger than the brake application determination threshold 807.

A target longitudinal distance 850 (column (A) of FIG. 5) indicates the longitudinal distance between the host vehicle 10 and the target when the time to collision has become smaller than the brake application determination threshold 805 and the host vehicle 10 has started decelerating by the first deceleration or the first braking force by the first deceleration controller 206.

A target longitudinal distance 851 (column (B) of FIG. 5) indicates the longitudinal distance between the host vehicle 10 and the target when the time to collision has become smaller than the brake application determination threshold 806 and the host vehicle 10 has started decelerating by the first deceleration or the first braking force by the first deceleration controller 206.

A target longitudinal distance 852 (column (C) of FIG. 5) indicates the longitudinal distance between the host vehicle 10 and the target when the time to collision has become smaller than the brake application determination threshold 807 and the host vehicle 10 has started decelerating by the first deceleration or the first braking force by the first deceleration controller 206.

A deceleration start timing 875 indicates the timing when the host vehicle 10 has started decelerating by the first deceleration or the first braking force by the first deceleration controller 206. A target intersecting region passing timing 876 indicates the timing when the target has passed through the predicted intersecting region 101.

A host vehicle reaching timing 877 indicates the timing when the host vehicle 10 has reached the predicted collision point after decelerating in the current host vehicle position 801 by the first deceleration or the first braking force by the first deceleration controller 206. An amount of time to reach the predicted collision point 878 indicates the amount of time to reach the predicted collision point in the current host vehicle position 801, and a predicted passing time 879 indicates the estimated amount of time to pass in the current target position 802.

Since the target longitudinal distance 851 is shorter than the target longitudinal distance 850, by decreasing the brake application determination threshold in step S410, the host vehicle 10 will apply a brake in a position even closer to the target. This increases the recognition accuracy of a sensor and the accuracy of predicting a path of the host vehicle 10 and a path of the target, and thus suppresses an excessive application of the brakes, resulting in improved functionality.

However, an upper limit is set for the predetermined time by which the brake application determination threshold is decreased in step S410. As shown in column (C) of FIG. 5, when a brake is applied based on the brake application determination threshold 807, since the amount of time to reach the predicted collision point 878 is equal to the predicted passing time 879, the target will pass through the predicted intersecting region 101 at a point in time when the host vehicle 10 reaches the predicted collision point.

If the brake application determination threshold is set even smaller than the brake application determination threshold 807, there is a possibility of a collision since the target has not passed through the predicted intersecting region 101 yet at a point in time when the host vehicle 10 reaches the predicted collision point. For this reason, the alerting/brake application determination unit 203 sets the predetermined time, by which the brake application determination threshold is decreased, as long as the predicted passing time 879 is not longer than the amount of time to reach the predicted collision point 878.

Referring back to FIG. 3, in step S411, the alerting/brake application determination unit 203 determines whether to apply a brake based on the time to collision calculated in step S402 and the brake application determination threshold calculated in step S405, or the brake application determination threshold decreased by the predetermined time in step S410. When the threshold change determination (S409) is satisfied, in one example, if the time to collision is below the brake application determination threshold decreased by the predetermined time in step S410, the alerting/brake application determination unit 203 makes a request for a brake application by the first deceleration or the first braking force by the first deceleration controller 206 to the brake instruction value calculation unit 205.

When the brake application determination threshold is set as a distance, in one example, a distance obtained by subtracting the travel distance of the host vehicle 10 at a current speed within the predetermined time from the host vehicle stopping distance is set as the brake application determination threshold, and if the target current longitudinal distance is below the brake application determination threshold, the alerting/brake application determination unit 203 makes a request for a brake application by the first deceleration or the first braking force by the first deceleration controller 206 to the brake instruction value calculation unit 205.

In the present embodiment, for the brake application, the brake application determination threshold is decreased by the predetermined time as long as the host vehicle 10 can reach the predicted collision point after the target finishes passing through the predicted intersecting region 101. However, if the target decelerates after the host vehicle 10 applies a brake, there is a possibility of a collision since the target has not passed through the predicted intersecting region 101 yet at a point in time when the host vehicle 10 reaches the predicted collision point. Thus, in step S410, if the host vehicle 10 detects the deceleration of the target after the host vehicle 10 applies a brake based on the time to collision that has fallen below the brake application determination threshold decreased by the predetermined time, the alerting/brake application determination unit 203 makes a request for a deceleration larger than the first deceleration or a braking force larger than the first braking force to the brake instruction value calculation unit 205 (that is, increases the deceleration or the braking force of the host vehicle according to the speed (deceleration) of the target when the host vehicle is decelerating by the first deceleration or the first braking force by the first deceleration controller 206), so that the host vehicle 10 can stop before reaching the predicted collision point to avoid a collision with the target.

When the host vehicle 10 and the target both have installed thereon the collision avoidance assistance device 11 of the present embodiment, the host vehicle 10 and the target may collide if they both apply the brakes and start decelerating when the time to collision falls below the brake application determination threshold decreased by the predetermined time. However, since the alerting/brake application determination unit 203 makes a request to the brake instruction value calculation unit 205 for a large deceleration or braking force (in the present embodiment, a deceleration larger than the first deceleration or a braking force larger than the first braking force) that allows both of the host vehicle 10 and the target to stop before reaching the predicted collision point upon detecting deceleration of the other vehicle, it is possible to avoid a collision between the host vehicle 10 and the target.

Figure 6:
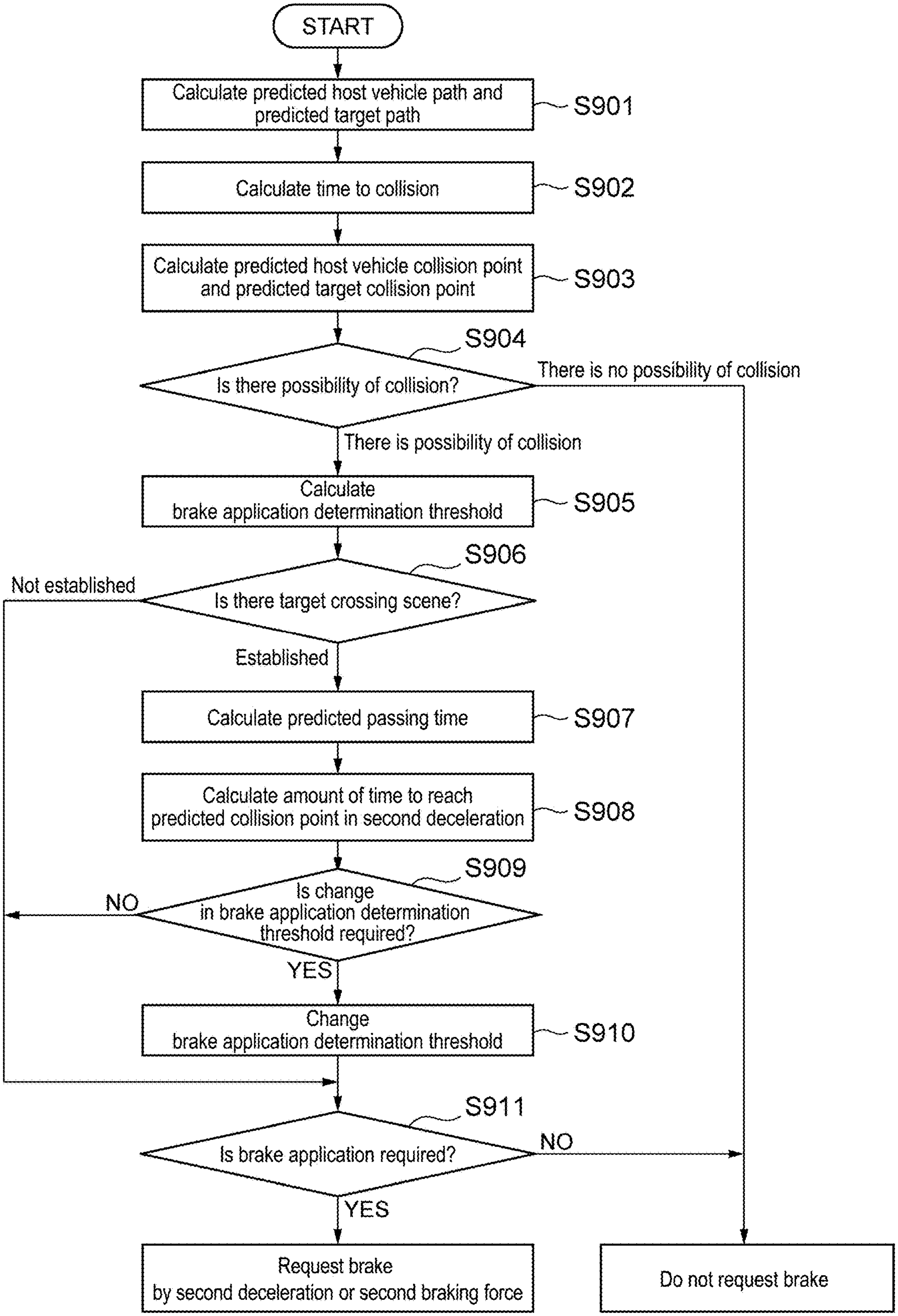
FIG. 6 is a flowchart of the alerting/brake application determination unit when the threshold used for determining whether or not to apply a brake is increased.

FIG. 6 is an example of the flowchart of the alerting/brake application determination unit 203, in the collision avoidance assistance in the embodiment of the present invention, when the threshold (brake application determination threshold) calculated in the alerting/brake application determination unit 203 is increased in avoidance of a collision by the second deceleration or the second braking force.

In steps S901, S902, S903, S904, S905, S906, and S907, the same processes as those in steps S401, S402, S403, S404, S405, S406, and S407 are performed.

In step S908, the alerting/brake application determination unit 203 calculates an amount of time that elapses until the host vehicle 10 reaches the predicted collision point (hereinafter appropriately referred to as an amount of time to reach the predicted collision point or an amount of time to reach the predicted collision point in second deceleration) when the host vehicle 10, at the host vehicle speed and the current host vehicle position, decelerates by the second deceleration or the second braking force by the second deceleration controller 207. If the distance from the host vehicle 10 to the predicted collision point is shorter than the distance required for stopping the host vehicle 10 (the host vehicle stopping distance) when the host vehicle 10 decelerates by the second deceleration or the second braking force by the second deceleration controller 207 from the host vehicle speed, the host vehicle 10 may not be able to avoid a collision at the predicted collision point. In this case, in one example, the amount of time to reach the predicted collision point in second deceleration is set to a value larger than the predicted passing time.

In step S909, in the same manner as in step S409, the threshold change determination is performed based on the predicted passing time and the amount of time to reach the predicted collision point in second deceleration. If the amount of time to reach the predicted collision point in second deceleration is longer than the predicted passing time (in other words, if the predicted passing time is shorter than the amount of time to reach the predicted collision point in second deceleration), the alerting/brake application determination unit 203 determines that the host vehicle 10 will not collide with the target even when the brake application determination threshold is increased since the target has already passed through the predicted intersecting region 101 at a point in time when the host vehicle 10 reaches the predicted collision point by decelerating by the second deceleration or the second braking force by the second deceleration controller 207, and then proceeds to step S910. If the amount of time to reach the predicted collision point in second deceleration is shorter than the predicted passing time (in other words, if the predicted passing time is longer than the amount of time to reach the predicted collision point in second deceleration), the alerting/brake application determination unit 203 determines not to increase the brake application determination threshold since the target has not passed through the predicted intersecting region 101 yet at a point in time when the host vehicle 10 reaches the predicted collision point by decelerating by the second deceleration or the second braking force by the second deceleration controller 207, and then proceeds to step S911. In the same manner as in step S409, the determination based on the host vehicle speed and the target speed may be added to the threshold change determination.

In step S910, the alerting/brake application determination unit 203 increases the brake application determination threshold calculated in step S905 by the predetermined time. The predetermined time is variable depending on the speeds of the host vehicle 10 and the target and the positional relationship therebetween.

Figure 7:
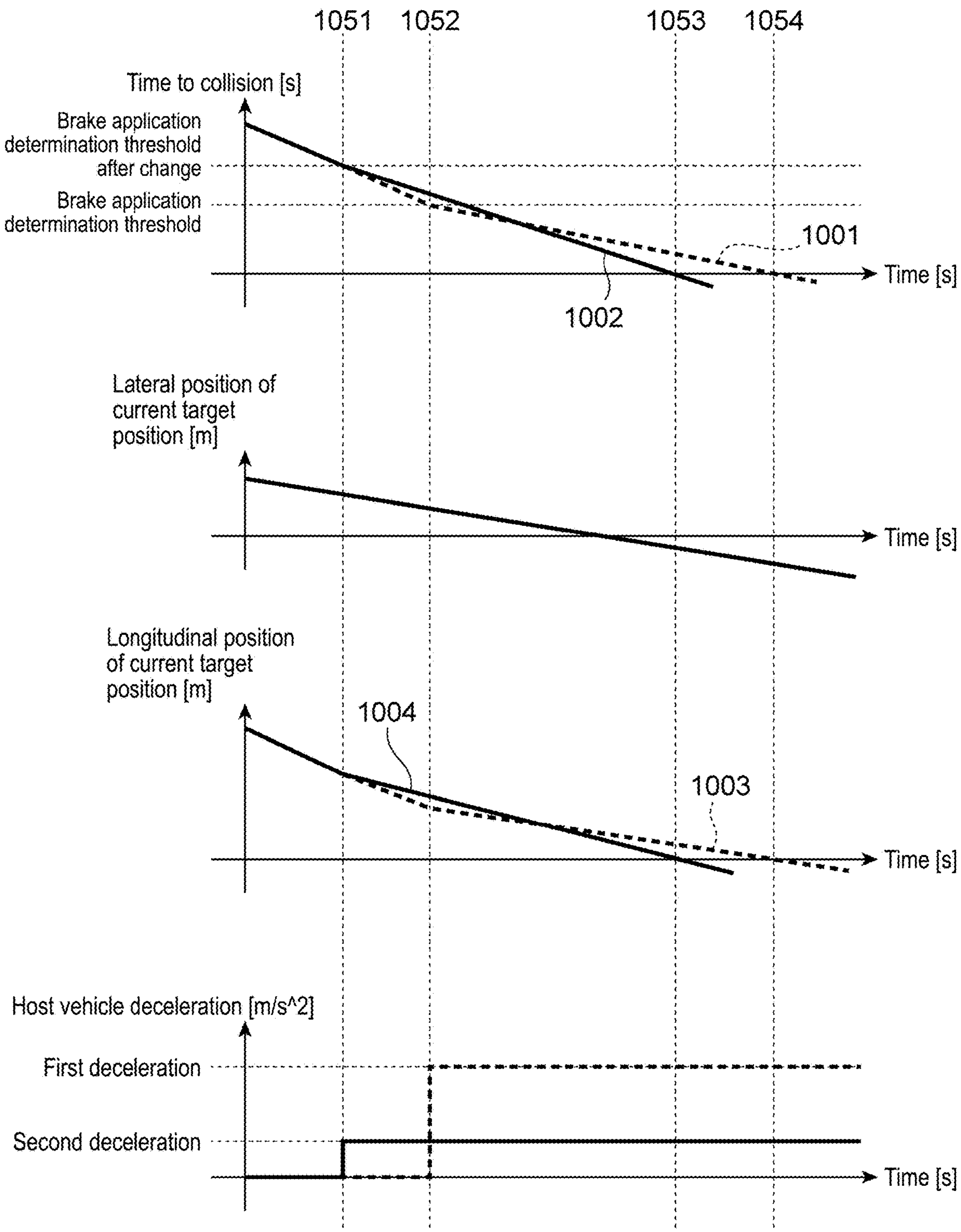
FIG. 7 shows an example of changes over time in a time to collision, a lateral position of a target, a longitudinal position of a target, and a deceleration of the host vehicle when the threshold used for determining whether or not to apply a brake is increased.

FIG. 7 shows changes over time in the time to collision, the lateral position of the current target position, the longitudinal position of the current target position, and the deceleration of the host vehicle 10 for each of the case where the brake application determination threshold is increased by the predetermined time and the host vehicle 10 decelerates by the second deceleration or the second braking force by the second deceleration controller 207 and the case where the host vehicle 10 decelerates by the first deceleration or the first braking force by the first deceleration controller 206 without a change in the brake application determination threshold in one example.

A dotted line graph 1001 represents the time to collision in the case where the host vehicle 10 decelerates by the first deceleration or the first braking force by the first deceleration controller 206 without a change in the brake application determination threshold, and a solid line graph 1002 represents the time to collision in the case where the brake application determination threshold is increased by the predetermined time and the host vehicle 10 decelerates by the second deceleration or the second braking force by the second deceleration controller 207.

A dotted line graph 1003 represents the longitudinal position of the current target position in the case where the host vehicle 10 decelerates by the first deceleration or the first braking force by the first deceleration controller 206 without a change in the brake application determination threshold, and a solid line graph 1004 represents the longitudinal position of the current target position in the case where the brake application determination threshold is increased by the predetermined time and the host vehicle 10 decelerates by the second deceleration or the second braking force by the second deceleration controller 207.

A deceleration start timing 1051 represents the timing when a brake is applied in the case where the brake application determination threshold is increased by the predetermined time, and a deceleration start timing 1052 represents the timing when a brake is applied without a change in the brake application determination threshold.

A predicted collision point reaching timing 1053 represents the timing when the host vehicle 10 has reached the predicted collision point in the case of decelerating by the second deceleration or the second braking force by the second deceleration controller 207 at the deceleration start timing 1051, and a predicted collision point reaching timing 1054 represents the timing when the host vehicle 10 has reached the predicted collision point in the case of decelerating by the first deceleration or the first braking force by the first deceleration controller 206 at the deceleration start timing 1052.

In the case where the brake application determination threshold is increased by the predetermined time, as compared to the case where the brake application determination threshold is not changed, the host vehicle 10 more slowly decelerates by the second deceleration smaller than the first deceleration or the second braking force smaller than the first braking force from a position in which the longitudinal position of the current target position is more distant, so as to avoid a collision. This can increase usability for a driver without deterioration of operability.

Referring back to FIG. 6, in step S911, the alerting/brake application determination unit 203 determines whether to apply a brake based on the time to collision calculated in step S902 and the brake application determination threshold calculated in step S905, or the brake application determination threshold increased by the predetermined time in step S910.

When the threshold change determination (S909) is satisfied, in one example, if the time to collision is below the brake application determination threshold increased by the predetermined time in step S910, the alerting/brake application determination unit 203 makes a request for a brake application by the second deceleration or the second braking force by the second deceleration controller 207 to the brake instruction value calculation unit 205.

When the brake application determination threshold is set as a distance, in one example, a distance obtained by adding the travel distance of the host vehicle 10 at a current speed within a predetermined time to the host vehicle stopping distance is set as the brake application determination threshold, and if the target current longitudinal distance is below the brake application determination threshold, the alerting/brake application determination unit 203 makes a request for a brake application by the second deceleration or the second braking force by the second deceleration controller 207 to the brake instruction value calculation unit 205.

In step S911, in the same manner as in step S411, if the host vehicle 10 detects the deceleration of the target after the host vehicle 10 applies a brake based on the time to collision that has fallen below the brake application determination threshold increased by the predetermined time, the alerting/brake application determination unit 203 makes a request for a deceleration larger than the second deceleration or a braking force larger than the second braking force to the brake instruction value calculation unit 205 (that is, increases the deceleration or the braking force of the host vehicle according to the speed (deceleration) of the target when the host vehicle is decelerating by the second deceleration or the second braking force by the second deceleration controller 207), so that the host vehicle 10 can stop before reaching the predicted collision point to avoid a collision with the target.

Note that when the brake instruction value calculation unit 205 includes both of the first deceleration controller 206 and the second deceleration controller 207, through the above-described processes, the alerting/brake application determination unit 203 may automatically determine according to the surrounding environment and the like, or the driver may determine (select) in advance, whether to decrease the brake application determination threshold and perform the operation of collision avoidance by the first deceleration or the first braking force (FIG. 3) or to increase the brake application determination threshold and perform the operation of collision avoidance by the second deceleration or the second braking force (FIG. 6).

As described above, the collision avoidance assistance device 11 of the present embodiment calculates a predicted path of a host vehicle (predicted host vehicle path) and a predicted path of an object (predicted target path) present on a road crossing the host vehicle, calculates a time to collision and a predicted collision point between the host vehicle and the object based on the predicted path of the host vehicle (predicted host vehicle path) and the predicted path of the object (predicted target path), and if the time to collision or a travel distance of the host vehicle in the time to collision is equal to or smaller than a brake application determination threshold, decelerates the host vehicle by a predetermined deceleration or braking force (a first deceleration or a first braking force by the first deceleration controller 206 or a second deceleration or a second braking force by the second deceleration controller 207) to avoid a collision with the object. The collision avoidance assistance device 11 calculates an amount of time to reach the predicted collision point, the amount of time to reach the predicted collision point being an estimated amount of time until the host vehicle reaches the predicted collision point when the host vehicle decelerates by the predetermined deceleration or braking force, and changes (increases or decreases) the brake application determination threshold based on a predicted passing time and the amount of time to reach the predicted collision point, the predicted passing time being an estimated time required for the object to pass through an intersecting region (predicted intersecting region) between the predicted path of the object (predicted target path) and the predicted path of the host vehicle (predicted host vehicle path).

In addition, the collision avoidance assistance device 11 includes the first deceleration controller 206 that decelerates the host vehicle by a first deceleration or a first braking force and the second deceleration controller 207 that decelerates the host vehicle by a second deceleration smaller than the first deceleration or a second braking force smaller than the first braking force, calculates an amount of time to reach the predicted collision point in first deceleration, the amount of time to reach the predicted collision point in first deceleration being an estimated amount of time until the host vehicle reaches the predicted collision point when the host vehicle is decelerated by the first deceleration controller 206, and decreases the brake application determination threshold when the predicted passing time is smaller than the amount of time to reach the predicted collision point in first deceleration.

In addition, the collision avoidance assistance device 11 includes the first deceleration controller 206 that decelerates the host vehicle by a first deceleration or a first braking force and the second deceleration controller 207 that decelerates the host vehicle by a second deceleration smaller than the first deceleration or a second braking force smaller than the first braking force, calculates an amount of time to reach the predicted collision point in second deceleration, the amount of time to reach the predicted collision point in second deceleration being an estimated amount of time until the host vehicle reaches the predicted collision point when the host vehicle is decelerated by the second deceleration controller 207, and increases the brake application determination threshold when the predicted passing time is smaller than the amount of time to reach the predicted collision point in second deceleration.

The collision avoidance assistance device 11 of the present embodiment compares a threshold for determining whether or not to apply a brake (brake application determination threshold) with a time to collision in assisting avoidance of a collision with an object traveling in a lane orthogonal to a host vehicle (i.e., a road crossing the host vehicle). Since the collision avoidance assistance device 11 of the present embodiment decreases the threshold as long as the possibility of a collision of the host vehicle with the object is low in comparison with the time to collision, the host vehicle can apply a brake in a position closer to the object and avoid a collision as compared to the conventional collision avoidance assistance devices. Since a brake is applied within a region where the distance from the host vehicle to the object is short, the recognition accuracy of a sensor and the accuracy of predicting a path of the host vehicle and a path of the object increase, and an excessive application of the brakes is suppressed, resulting in improved functionality.

In addition, as a technique different from the above-described technique, the collision avoidance assistance device 11 of the present embodiment decreases a braking force or a deceleration of the host vehicle required to avoid a collision and increases a threshold for determining whether or not to apply a brake (brake application determination threshold). Increasing the threshold allows the host vehicle to more slowly decelerate from the position more distant from the object as compared to the threshold before increasing to avoid a collision. This can increase usability for a driver without deterioration of operability.

As described above, according to the present embodiment, it is possible to improve functionality and usability by suppressing an excessive application or emergency application of the brakes.

Figure 8:
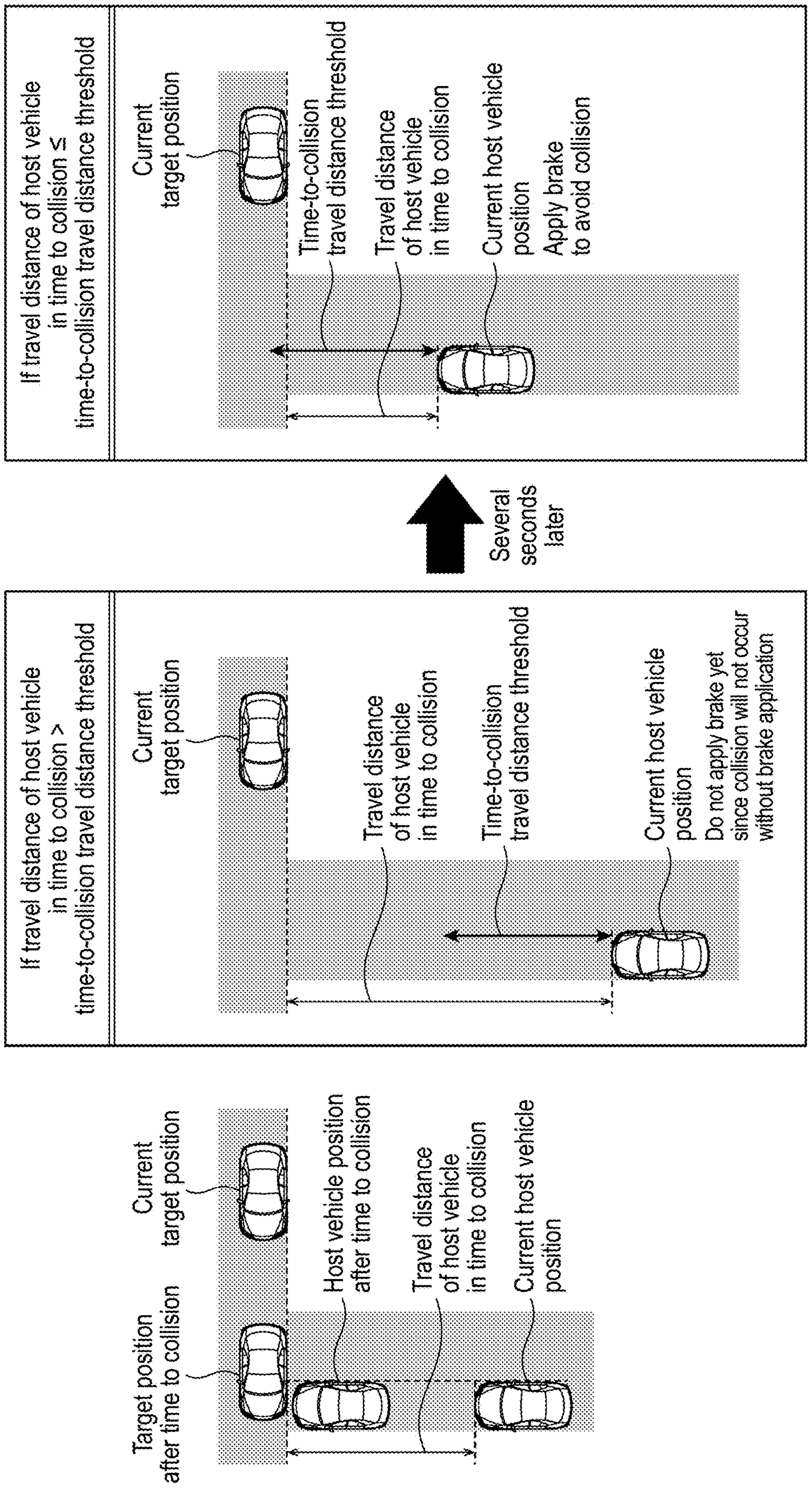
FIG. 8 is a diagram illustrating a relationship between a threshold used for determining whether or not to apply a brake (a brake application determination threshold or a time-to-collision travel distance threshold) and a travel distance of a host vehicle in a time to collision.

As a comparison with the threshold required for determining whether or not to apply a brake (brake application determination threshold), the following is an additional description of using a travel distance of the host vehicle in the time to collision in place of the time to collision. The time to collision is the time that remains until the host vehicle collides with the target. In the case of the intersection as in the present embodiment, the time to collision is an amount of time that elapses until the longitudinal position of the host vehicle becomes equal to the longitudinal position of the target, and thus the travel distance of the host vehicle in the time to collision means the same as the longitudinal distance from the current host vehicle position to the target (see the left figure of FIG. 8). The brake application determination threshold (also referred to as a time-to-collision travel distance threshold) indicates a distance obtained by increasing or decreasing the above distance by the present embodiment based on the distance required for the host vehicle to stop when the host vehicle decelerates by the deceleration or the braking force. Since the brake application determination threshold (time-to-collision travel distance threshold) is a minimum distance required to avoid a collision, a collision will not occur without a brake application if the result of comparison between the travel distance of the host vehicle in the time to collision and the brake application determination threshold (time-to-collision travel distance threshold) is the travel distance of the host vehicle in the time to collision>the brake application determination threshold (time-to-collision travel distance threshold) (see the center figure of FIG. 8). In this case, a brake will not be applied. In contrast, if the result of comparison is the travel distance of the host vehicle in the time to collision≤the brake application determination threshold (time-to-collision travel distance threshold) (see the right figure of FIG. 8), a brake will be applied to avoid a collision.

Note that the present invention is not limited to the foregoing embodiment, and according to the speeds of the host vehicle 10 and the target and the positional relationship therebetween or the form of roads on which the host vehicle 10 and the target are traveling and the like, a process of determining whether or not a change in the brake application determination threshold is required may be added in step S409 and step S909. For example, in determining whether or not a change in the brake application determination threshold is required in the form of roads on which the host vehicle 10 and the target are traveling, the brake application determination threshold may not be changed when the host vehicle 10 is traveling on a non-priority road since it needs to surely stop before reaching the intersection.

In the present embodiment, the example of collision avoidance by applying a brake with respect to one vehicle that may possibly collide with the host vehicle 10 has been described. Meanwhile, when there are a plurality of targets that may possibly collide with the host vehicle 10, there is a possibility that, after a brake is applied with respect to one of the plurality of targets that may first collide with the host vehicle 10 by changing the brake application determination threshold and a collision is avoided, another one of the plurality of targets will collide with the host vehicle 10. Thus, when there are a plurality of targets that may possibly collide with the host vehicle 10, the host vehicle 10 may be configured to surely stop before reaching the one of the plurality of targets that may first collide with the host vehicle 10 without a change in the brake application determination threshold.

In the present embodiment, the example of collision avoidance by applying a brake when the driver of the host vehicle 10 does not perform a vehicle operation has been described. Meanwhile, when a collision avoidance action by the driver can be expected before or after a brake application from information on the vehicle operation by the driver of the host vehicle 10, the vehicle operation (braking operation) by the driver cannot avoid a collision in some cases. Thus, the host vehicle 10 may be configured to surely stop before reaching the predicted collision point without a change in the brake application determination threshold.

Note that the present invention is not limited to the foregoing embodiment, and includes a variety of modifications. For example, the foregoing embodiment has been described in detail to clearly illustrate the present invention, and the present invention need not include all of the structures described in the embodiment.

In addition, some or all of the aforementioned structures, functions, processing units, processing means, and the like may be implemented as hardware by designing them into an integrated circuit, for example. Alternatively, each of the functions may be implemented as software such that a processor analyzes and executes a program that implements each function.

Information such as the program that implements each function, tables, and files can be stored in a storage device such as memory, a hard disk, or a SSD (Solid State Drive); or a storage medium such as an IC card, an SD card, or a DVD.

In addition, the control lines and information lines represent those that are considered to be necessary for description purposes, and represent not all control lines and information lines that are necessary for implementation. In practice, almost all structures may be considered to be mutually connected.

DESCRIPTION OF SYMBOLS

2 Camera
3 Millimeter wave radar
4 Wheel
5 Wheel speed sensor
6 Steering angle sensor
7 Yaw rate sensor
8 Meter
9 Buzzer
10 Vehicle (host vehicle)
11 Collision avoidance assistance device
12 Brake control device

100 Road with intersection
101 Predicted intersecting region
201 Target-information integration processing unit
202 Host-vehicle-information calculation unit
203 Alerting/brake application determination unit
204 Collision alert calculation unit
205 Brake instruction value calculation unit
206 First deceleration controller
207 Second deceleration controller

What is claimed is:

1. A collision avoidance assistance device comprising one or more processors configured to:

calculate a predicted path of a host vehicle and a predicted path of an object present on a road crossing the host vehicle;

calculate a time to collision and a predicted collision point between the host vehicle and the object based on the predicted path of the host vehicle and the predicted path of the object; and if the time to collision or a travel distance of the host vehicle in the time to collision is equal to or smaller than a brake application determination threshold, decelerate the host vehicle by a predetermined deceleration or braking force to avoid a collision with the object, wherein the one or more processors are configured to:

calculate an amount of time to reach the predicted collision point, the amount of time to reach the predicted collision point being an estimated amount of time until the host vehicle reaches the predicted collision point when the host vehicle decelerates by the predetermined deceleration or braking force;

calculate a predicted overlap ratio based on the predicted path of the host vehicle and the predicted path of the object, the predicted overlap ratio being a ratio corresponding to a length of an overlapping portion between the host vehicle and the object at the predicted collision point;

calculate a predicted passing time based on the predicted overlap ratio;

change the brake application determination threshold based on the predicted passing time and the amount of time to reach the predicted collision point, the predicted passing time being an estimated time required for the object to pass through an intersecting region between the predicted path of the object and the predicted path of the host vehicle, by decreasing the brake application determination threshold when the predicted passing time is smaller than the amount of time to reach the predicted collision point; and in response to the host vehicle starting to decelerate based on the brake application determination threshold having been changed, detect deceleration of the object, and in response to the detected deceleration of the object, increase a deceleration or a braking force of the host vehicle such that the host vehicle stops before reaching the predicted collision point.

2. The collision avoidance assistance device according to claim 1, wherein the collision avoidance assistance device comprises one or more processors configured to:

decelerate the host vehicle by a first deceleration or a first braking force and decelerate the host vehicle by a second deceleration smaller than the first deceleration or a second braking force smaller than the first braking force;

calculate an amount of time to reach the predicted collision point in first deceleration, the amount of time to reach the predicted collision point in first deceleration being an estimated amount of time until the host vehicle reaches the predicted collision point when the host vehicle is decelerated by the first deceleration controller; and decrease the brake application determination threshold when the predicted passing time is smaller than the amount of time to reach the predicted collision point in first deceleration.

3. The collision avoidance assistance device according to claim 1, wherein the one or more processors are configured to:

decelerate the host vehicle by a first deceleration or a first braking force and decelerate the host vehicle by a second deceleration smaller than the first deceleration or a second braking force smaller than the first braking force;

calculate an amount of time to reach the predicted collision point in second deceleration, the amount of time to reach the predicted collision point in second deceleration being an estimated amount of time until the host vehicle reaches the predicted collision point when the host vehicle is decelerated; and increase the brake application determination threshold when the predicted passing time is smaller than the amount of time to reach the predicted collision point in second deceleration.

4. The collision avoidance assistance device according to claim 1, wherein the one or more processors are configured to allow changing the brake application determination threshold when a vehicle speed of the host vehicle is larger than a predetermined host vehicle speed threshold.

5. The collision avoidance assistance device according to claim 1, wherein the one or more processors are configured to allow changing the brake application determination threshold when a vehicle speed of the object is larger than a predetermined object vehicle speed threshold.

6. The collision avoidance assistance device according to claim 1, wherein the one or more processors are configured to calculate a time to be added to the predicted passing time based on at least one of a speed of the object or a distance between the object and the host vehicle.

* * * * *